(12) United States Patent
Netz et al.

(10) Patent No.: US 10,510,012 B2
(45) Date of Patent: Dec. 17, 2019

(54) REAL TIME INTERACTIVE PREDICTION

(71) Applicant: Microsoft Technology Licensing, LLC, Redmond, WA (US)

(72) Inventors: Amir Netz, Bellevue, WA (US); Moshe Golan, Haifa (IL); Chairy Chiu Ying Cheung, Redmond, WA (US); Yury Berezansky, Kiryat Atta (IL); Oded Bar Levy, Kibbutz Einat (IL); Yoav Yassour, Haifa (IL); Yifat Sagiv, Haifa (IL); Ran Didi, Haifa (IL)

(73) Assignee: Microsoft Technology Licensing LLC, Redmond, WA (US)

( * ) Notice: Subject to any disclaimer, the term of this patent is extended or adjusted under 35 U.S.C. 154(b) by 657 days.

(21) Appl. No.: 14/262,923

(22) Filed: Apr. 28, 2014

(65) Prior Publication Data

US 2015/0310343 A1 Oct. 29, 2015

(51) Int. Cl.
*G06F 17/00* (2019.01)
*G06F 17/20* (2006.01)
(Continued)

(52) U.S. Cl.
CPC .............. *G06N 5/048* (2013.01); *G06Q 10/04* (2013.01); *G06Q 30/0202* (2013.01)

(58) Field of Classification Search
CPC .......... G06N 3/126; G06N 7/005; G06N 5/02; G06N 5/048
See application file for complete search history.

(56) References Cited

U.S. PATENT DOCUMENTS

| 6,611,726 B1 | 8/2003 | Crosswhite |
| 2005/0080576 A1* | 4/2005 | Dickerson ............. G06F 17/156 |
| | | 702/76 |

(Continued)

FOREIGN PATENT DOCUMENTS

| CN | 102982097 A | 3/2013 |
| CN | 103678953 A | 3/2014 |

(Continued)

OTHER PUBLICATIONS

"Understanding the Computer" Tamara Smyth, tamaras@cs.sfu.ca School of Computing Science (Year: 2009).*

(Continued)

*Primary Examiner* — Luis A Sitiriche
(74) *Attorney, Agent, or Firm* — Workman Nydegger

(57) ABSTRACT

Providing predictive data predicting data values for a historical dataset. The method facilitates improving the accuracy of the predictive data by identifying for a user, and allowing the user to select ancillary datasets that can be evaluated, using a predictive evaluation, together with a historical dataset to improve the accuracy of the predictive data. A user interface is provided to a user. The user interface identifies one or more ancillary datasets. The ancillary datasets are identified to the user based on the ancillary datasets meeting a threshold condition to a historical dataset. The ancillary datasets are selectable by the user in the user interface. User input is received at the user interface selecting one or more of the ancillary datasets. A predictive dataset is displayed to the user. The predictive dataset is determined by predictive evaluation of the historical dataset and the one or more selected ancillary datasets.

19 Claims, 11 Drawing Sheets

(51) Int. Cl.
*G06N 5/04* (2006.01)
*G06Q 10/04* (2012.01)
*G06Q 30/02* (2012.01)

(56) References Cited

U.S. PATENT DOCUMENTS

| | | | |
|---|---|---|---|
| 2005/0102175 | A1 | 5/2005 | Dudat et al. |
| 2006/0002532 | A1 | 1/2006 | Horvitz et al. |
| 2007/0266138 | A1* | 11/2007 | Spire ............... G06F 11/0709 709/223 |
| 2014/0101076 | A1 | 4/2014 | Martin et al. |

FOREIGN PATENT DOCUMENTS

| | | |
|---|---|---|
| JP | 2000215251 A | 8/2000 |
| JP | 2001216372 A | 8/2001 |
| JP | 2002169946 A | 6/2002 |
| JP | 2004272674 A | 9/2004 |
| JP | 2010146413 A | 7/2010 |
| JP | 2014010484 A | 1/2014 |
| RU | 2295156 C2 | 3/2007 |
| RU | 2480825 C2 | 4/2013 |
| WO | 2013071414 A1 | 5/2013 |

OTHER PUBLICATIONS

"International Search Report and Written Opinion Issued in PCT Application No. PCT/US2015/026970", dated Jul. 3, 2015, 11 Pages.

"Generating Forecasts", Published on: Nov. 25, 2011, Available at: http://docs.oracle.com/cd/B19306_01/olap.102/b14349/forecast.htm.

"14-Day Tide Forecasts & Hindcasts Interactive Map", Retrieved on: Mar. 10, 2014, Available at: http://www.twdb.state.tx.us/surfacewater/bays/tides/map/index.asp?timeframe=14.

"Predictive Analytics with TIBCO Spotfire and TIBCO Enterprise Runtime for R", In whitepaper of TIBCO, Retrieved on Mar. 10, 2014, pp. 1-13.

Jr., R. Pielke, "UKMET Short Term Global Temperature Forecast", Published on: Jan. 16, 2008, Available at: http://cstpr.colorado.edu/prometheus/archives/climate_change/001324ukmet_short_term_glo.html.

Smakhtin, et al., "Automated Estimation and Analyses of Meteorological Drought Characteristics from Monthly Rainfall Data", In Journal of Environmental Modelling & Software, vol. 22 Issue 6, Jun. 2007, 14 pages.

Ruch, "Continuous Flood Forecasting Combined with Automatic Forecast Correction—Application on the Mur River", In Proceedings of Conference abstracts, Str. 21, Retrieved on Mar. 10, 2014, 13 pages.

"Office Action Issued in Russian Patent Application No. 2016142214", dated Nov. 16, 2018, 17 Pages.

"Office Action Issued in Mexican Patent Application No. MX/a/2016/014092", dated Oct. 9, 2018, 4 Pages.

"First Office Action and Search Report Issued in Chinese Patent Application No. 201580023459.6", dated Jan. 21, 2019, 15 Pages.

"Office Action Issued in Japanese Patent Application No. 2016-565281", dated Feb. 28, 2019, 12 Pages.

"Office Action Issued in Mexican Application No. MX/a/2016/014092", dated Feb. 26, 2019, 7 Pages.

"Office Action Issued in Russian Application No. 2016142214", dated Nov. 16, 2018, 17 Pages.

"Office Action Issued in Mexican Application No. MX/a/2016/014092", dated Oct. 9, 2018, 4 Pages.

"Second Office Action Issued in Chinese Application No. 201580023459.6", dated Jul. 15, 2019, 12 Pages.

* cited by examiner

REAL TIME INTERACTIVE PREDICTION

BACKGROUND

Background and Relevant Art

Computers and computing systems have affected nearly every aspect of modern living. Computers are generally involved in work, recreation, healthcare, transportation, entertainment, household management, etc.

Data forecasting relates to computerized methods which analyze past data points of a dataset and try to predict values of future data points for the same dataset. For example, a system may examine a dataset having data points for the historical price of gasoline. Based on the historical data points, algorithms may try to predict the future price of gasoline.

Data forecasting typically requires a manual, complex process of historical data preparation, defining system training and testing, defining forecast targets and in most cases explicit choice of one or more forecast algorithms and parameters configurations. The forecast operation assumes historical data is well prepared to be consumed by forecast algorithms, including data format and completeness.

The statistical analysis of data forecasting can be enhanced by examining related datasets. For example, a more accurate prediction of gasoline prices may be able to be generated when a forecasting algorithm has access to other related datasets. For example, historical average temperature may be correlated to the historical price of gasoline. Thus, a better prediction of the future price of gasoline can be obtained by using both the historical price of gasoline and the historical average temperature. The related data set's historical data alone is typically not used for predicting the target data set. Rather, future data for the related data set is also used. Systems can analyze how the related data set correlated to the target data set in the past and assuming the same correlation in the future, systems can use the related data set's future data to adjust the target data set's forecast.

In some cases a user might know or plan the related data set's future data. For example, a company can plan the advertisement budget or the sales force. Or, in the example with weather, the meteorological forecast can be used. In other cases when there is no future data for the related data set, systems can first predict the factor and then use it in the target data set's forecast However, it can be difficult to determine what other datasets should be used to improve forecasting accuracy. Indeed in modern forecasting, selection of correlating datasets is not just a manual process, but it is a manual process that is typically limited to a small group of so-called "experts" who have the knowledge about what additional datasets should be used to improve forecasting. Thus, this results in analyses that are limited by human capabilities, are very expensive, and take significant time to perform.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a computing environment. The method includes acts for providing predictive data predicting data values for a historical dataset. The predictive data predicts either future values for the historical data set or past values for the historical dataset. The method further facilitates improving the accuracy of the predictive data by identifying for a user, and allowing the user to select ancillary datasets that can be evaluated, using a predictive evaluation, together with a historical dataset to improve the accuracy of the predictive data. The method includes providing a user interface to a user. The user interface identifies one or more ancillary datasets. The ancillary datasets are identified to the user based on the ancillary datasets meeting a threshold condition to a historical dataset. The ancillary datasets are selectable by the user in the user interface. The method further includes receiving user input at the user interface selecting one or more of the ancillary datasets. The method further includes displaying a predictive dataset to the user. The predictive dataset predicts either future data values or past data values for the historical dataset. The predictive dataset is determined by predictive evaluation of the historical dataset and the one or more selected ancillary datasets.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
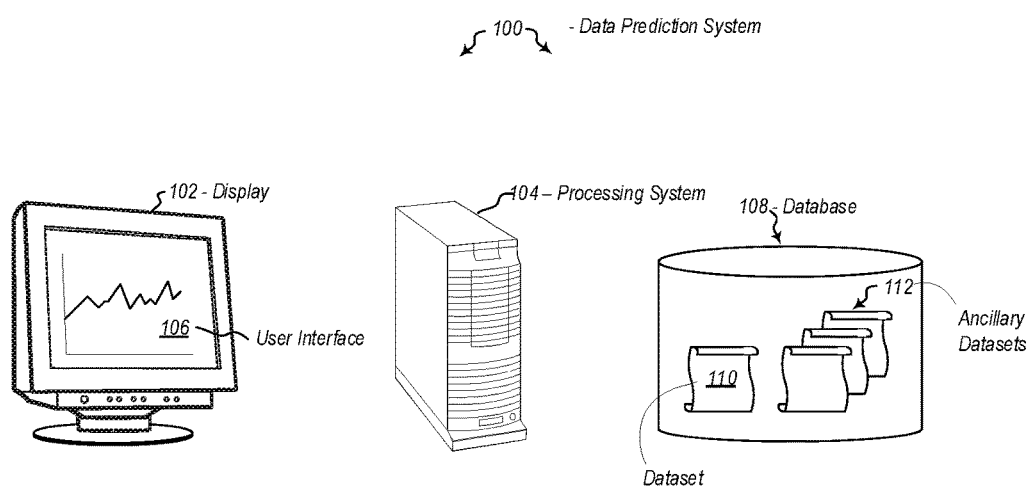
FIG. 1 illustrates a system for providing predictive data.

Embodiments herein may have various features to facilitate data prediction. Data prediction, as used herein relates to predicting data values. Predicting data values can be performed in a forward looking manner to predict future results (i.e. forecasting) or can be performed in a backward looking manner to predict past results (i.e. hindcasting).

Some embodiments herein may implement a real-time interactive data prediction system. For example, a user can adjust various parameters such as historical data points, the prediction period defining how far out (or back) a forecast (or hindcast) should be performed, the seasonality defining cyclical effects that may affect a prediction, what ancillary datasets are used to evaluate a dataset, etc. The system can use the user input and automatically, in a real-time fashion, predict future or past data.

The system may additionally or alternatively include functionality for automatically preparing datasets for analysis. For example, embodiments can add missing data points to a dataset, correct malformed data, and otherwise automatically prepare datasets for predictive analysis.

The system may additionally or alternatively include functionality for automatically selecting certain prediction parameters. For example, there are often a number of different prediction algorithms that can be selected to perform prediction functionality. Embodiments may be configured to identify a particular algorithm from a set of algorithms and apply a dataset to the selected algorithm. In an alternative or additional example, the system may be configured to automatically select the seasonality. In yet another example, embodiment may automatically select ancillary datasets to be used to refine a prediction for a given dataset. Embodiments may allow for adjustments to ancillary datasets. Adjustments may be ad-hoc one-off adjustments. Alternatively or additionally adjustments may be made using policies. For example, policies may be chosen from a pre-defined set or newly-defined. Example, policies may include data completion policies, zero fill policies, linear interpolation polices, calendar-based policies, etc. Notably, embodiments may allow a user to override the automatic policy based selections.

The system can alternatively or additionally include functionality for suggesting ancillary datasets that can be used in evaluating a given dataset. A user can then select one or more suggested ancillary datasets to observe how evaluating a dataset in the context of one or more ancillary datasets affects the dataset being evaluated. Ancillary datasets may be determined by the system based one or more conditions. For example, an ancillary dataset may be identified by the system based on a correlation strength between the ancillary dataset and the subject dataset. In some embodiments, additional ancillary datasets may be identified based on the additional ancillary datasets having a high correlation strength to an already identified ancillary dataset. In some embodiments, additional ancillary datasets may be continue to be identified as appropriate conditions occur.

Referring now to FIG. 1, a data prediction system 100 is illustrated. The data prediction system 100 includes a display 102 configured to display data in datasets. In the illustrated example, the display 102 is shown displaying graphical representations of data points. The display 102 is coupled to a processing system 104. Some embodiments may be implemented where all of the components illustrated in FIG. 1 are included in a single system. For example, the components may be included in a spreadsheet program, such as Excel® available from Microsoft Corporation of Redmond, Wash.

The processing system 104 may be implemented, for example, by configuring a computer system to a special purpose computing system configured for accessing datasets and operating on the datasets to generate predicted data. In some embodiments, this can be accomplished by adding the forecast features to various computer programs. For example, in some embodiments, the prediction functionality can be implemented as an interactive feature in Power View implemented as part of Excel® spreadsheet software available from Microsoft Corporation of Redmond Wash. The prediction functionality can be implemented together to enhance existing data models and/or existing reports. The processing system 104 may be configured to access data, format data, generate new data, and to control the display 102 for displaying various representations of data. In some embodiments, the processing system may be implemented as a so called "cloud service".

The processing system 104 may be configured to implement a user interface 106 using the display 102 and various peripheral devices, such as keyboards, mice, touchscreens, motion sensors, cameras, etc. This can allow a user to interact with data or controls displayed on the display 102 which can then be taken into account when performing predication operations.

FIG. 1 further illustrates a database 108. The database is coupled to the processing system 104, and indeed in many cases is integral to the processing system 104. Alternatively, the database 108 illustrated may be representative of several databases, some of which could be local to the processing system 104 and some of which could be more remote from the processing system 104. The database may take various local, remote and/or distributed forms. The database 104, as will be discussed in detail below, includes various datasets. In particular, the database includes various datasets for which prediction operations will be performed (as represented by the dataset 110). The database also includes various ancillary datasets (illustrated at 112) which can be used to enhance the prediction algorithms applied to the dataset 110 under analysis.

Thus, the processing system 104 can access a dataset 110. The processing system 104 can cause a representation of the dataset 110 to be displayed at the display 102, along with various user interface elements. A user can interact with the representation of the dataset 110 by interacting with the user interface 106. For example, a user may manually adjust existing data points, set the seasonality (i.e. expected cyclical factors) for a prediction, select one or more ancillary datasets from among the datasets 112 to be used in a prediction process applied to the dataset 110, etc. Prediction algorithms can then be implemented by the processing system 104, taking into account the user input to provide a prediction, such as a forecast or hindcast of data.

Referring now to FIGS. 2-10, several screen shots are illustrated to illustrate the user experience and functionality of various embodiments.

Figure 2:
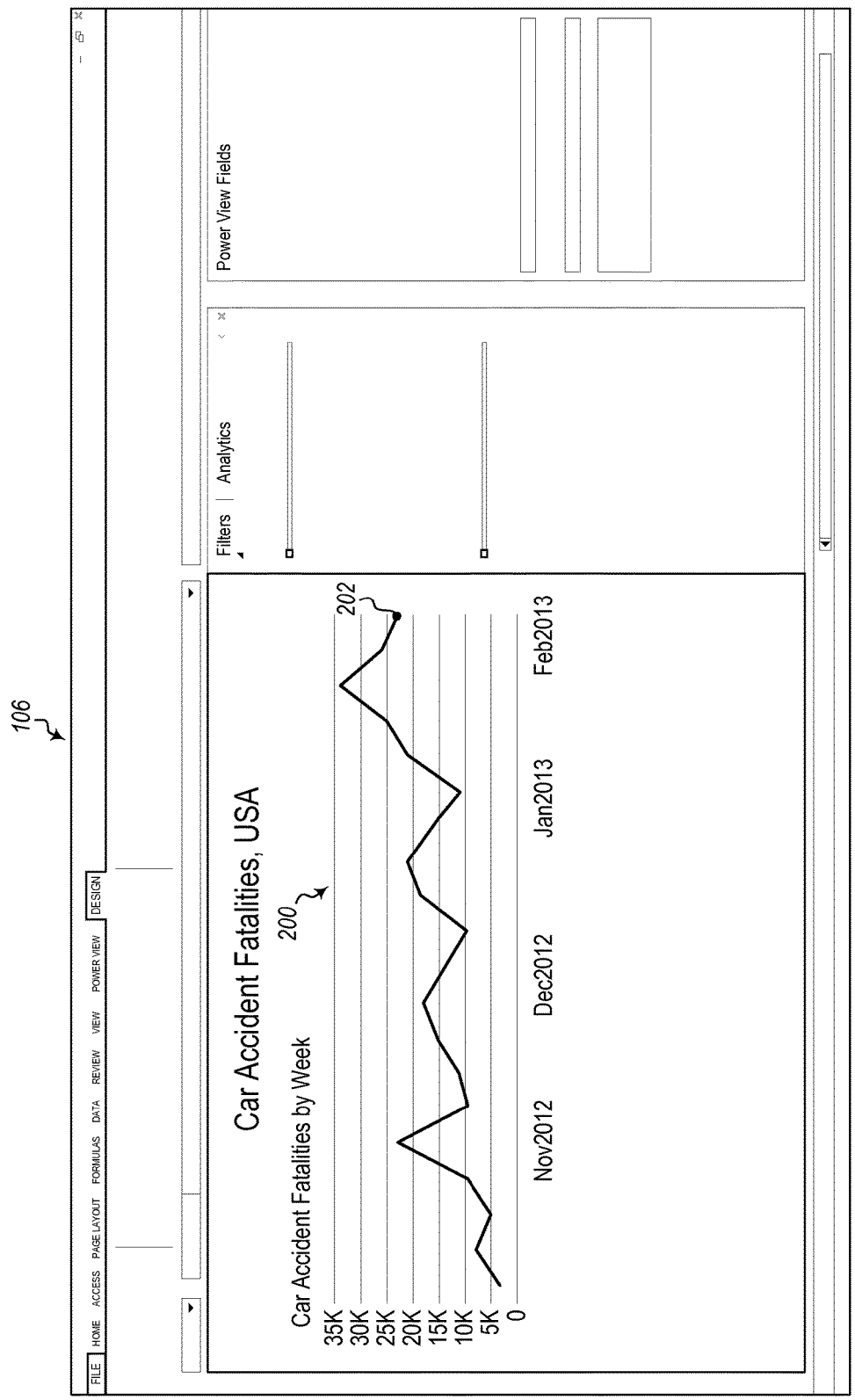
FIG. 2 illustrates a screenshot of a user interface used in a data prediction system.
Figure 3:
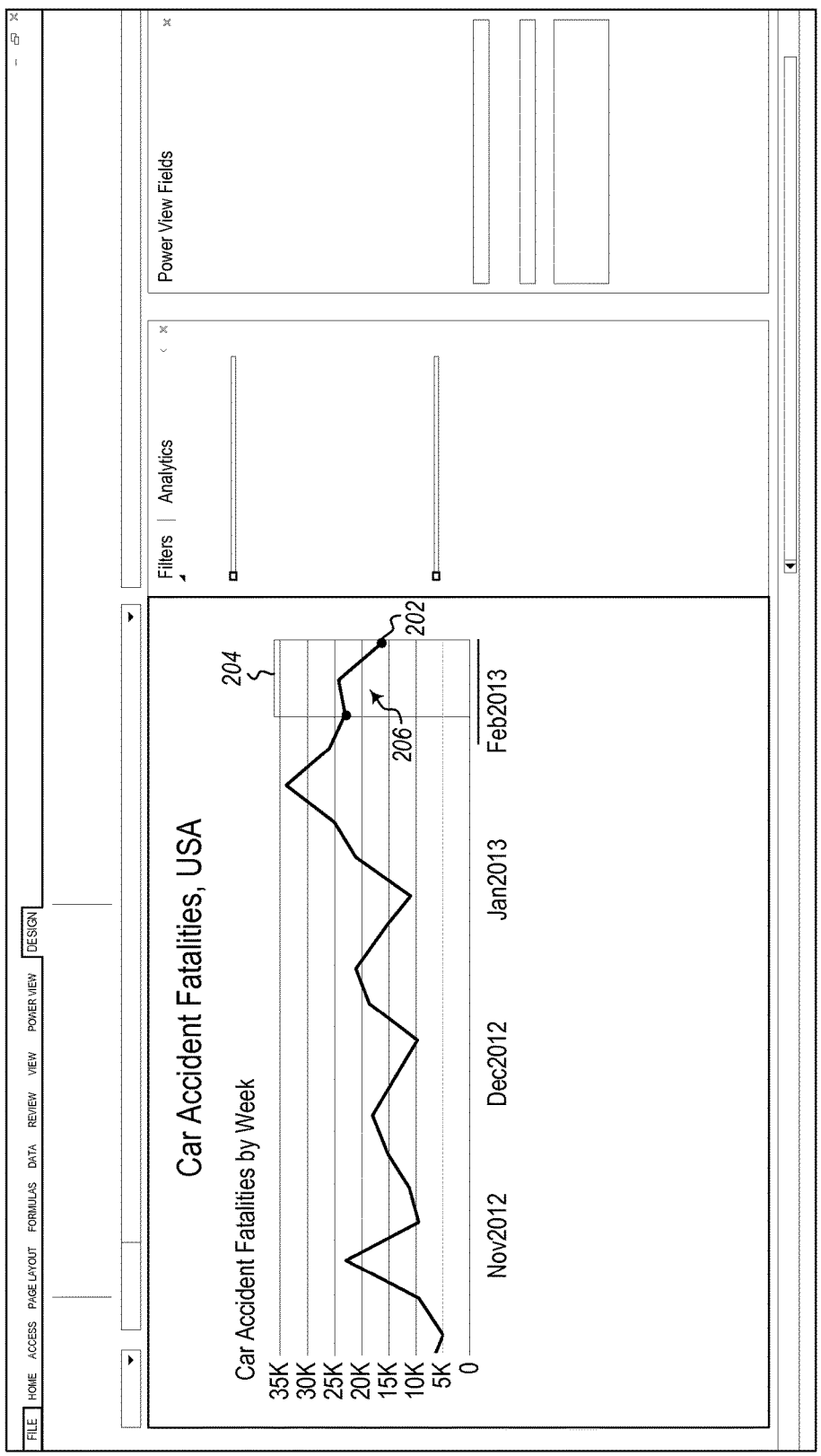
FIG. 3 illustrates a screenshot of a user interface used in a data prediction system.

FIG. 2 illustrates a graphical representation 200 of a dataset (e.g. dataset 110) displayed on the display 102 (see FIG. 1) documenting car accident fatalities in the United States. The dataset includes data up until February 2013. There may be a desire to forecast fatalities that will occur in the future past the February 2013 date. In the illustrated example, the user interface 106 allows a user to interact with the graphical representation 200 or with various other knobs and setting available in the user interface 106. FIG. 2 illustrates a forecast handle 202. The forecast handle 202 is selectable by a user and can be dragged by a user out to a point to which a forecast is desired. For example, FIG. 3 illustrates a prediction time period 204 created by dragging the handle 202 to a desired date location. Appropriate forecast data 206 is then created by the processing system 106 using an appropriate forecasting algorithm. Thus, the forecast operation can be easily implemented by formatting an existing report.

Figure 4:
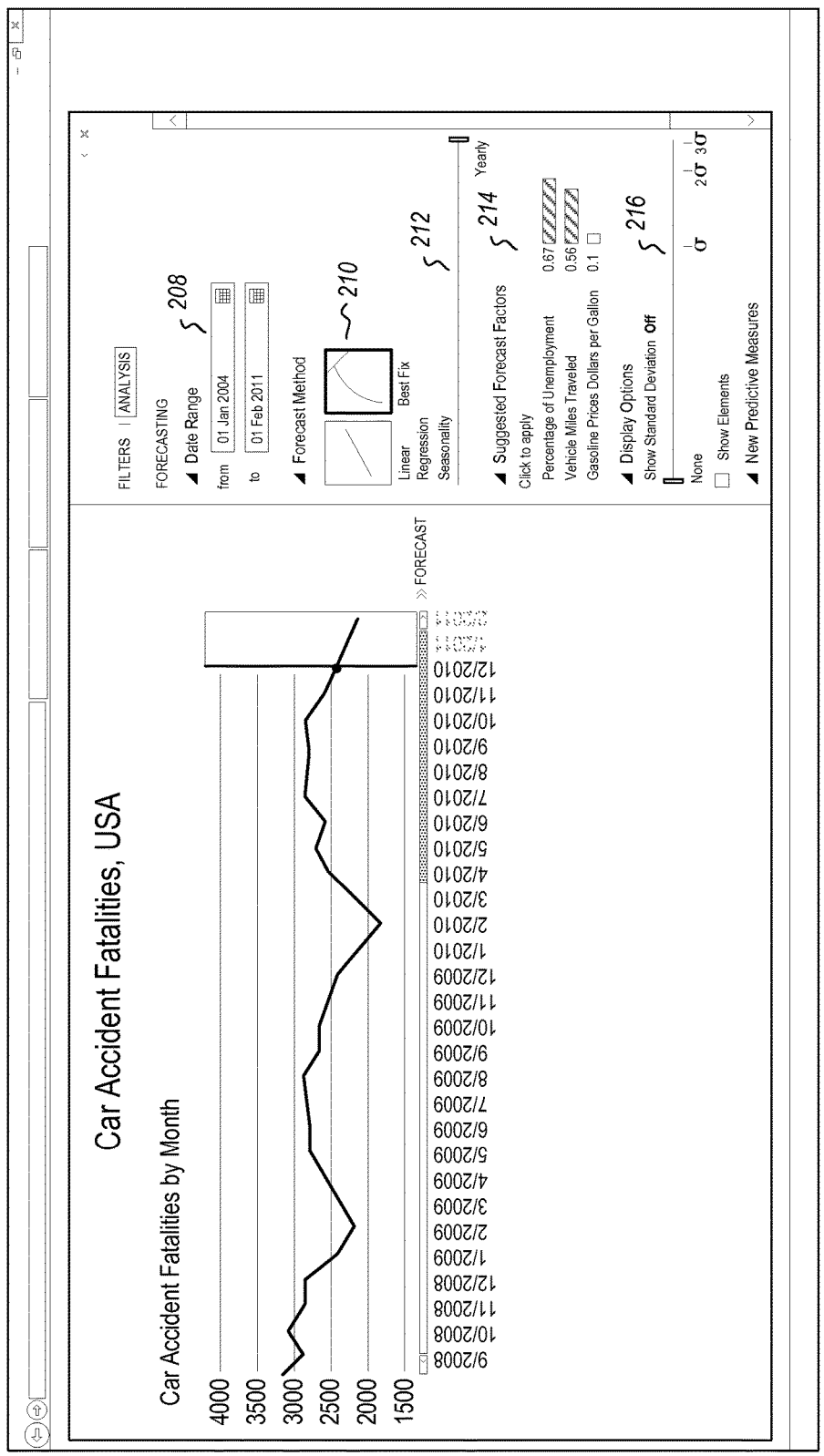
FIG. 4 illustrates a screenshot of a user interface used in a data prediction system.

Referring now to FIG. 4, various user selectable options are illustrated. In particular, a user may be presented with various options and may be able to select various options to control how predicted data is generated and/or reported. For example, as illustrated at 208, a user may be able to select a data range used for data prediction. In particular, the user selects the dates that are desired to be used as input to a data prediction algorithm.

As illustrated at 210, a user can select a particular data prediction method. In the illustrated example, the user is presented with a linear regression method or a best fit method.

As illustrated at 212, a user can select seasonality. The seasonality defines the cyclical nature of a dataset. For example, for sales data, it is expected that there is an annual seasonality as there are certain times of the year when certain goods or services are more (or less) often consumed. In the illustrated example, seasonality can be selected with a slider which may allow a user to select options such as hourly, daily, weekly, monthly, quarterly, yearly, or some other appropriate period.

As illustrated at 214, the processing system 104 can present a user with various suggested forecast factors. Forecast factors are ancillary datasets 112 that may be helpful to refine a prediction for a given dataset 110. In particular, ancillary datasets can be used in a predication algorithm as input that helps to refine the prediction. Forecast factors may be datasets that are related by some correlation factor to an underlying dataset or otherwise related to the underlying dataset. For example, an ancillary dataset may have data that changes similarly to the underlying dataset 110. The more closely an ancillary dataset tracks the underlying dataset, the more correlated the ancillary dataset is to the underlying dataset. For example, as illustrated in FIG. 4, an ancillary dataset including data regarding percentage of unemployment has a 67% correlation to the underlying dataset for car accident fatalities in the United States. A dataset having data regarding the number of vehicle miles travelled has a 56% correlation to the underlying dataset. A dataset having data regarding gasoline prices in dollars per gallon has a 10% correlation to the underlying dataset. Thus, a user can select one or more of the forecast factors (i.e. ancillary datasets) to be evaluated together with the underlying data to refine any predictions.

FIG. 4 further illustrates at 216 that embodiments can allow users to select whether or not predicted data is shown within some number of standard deviations. If a user selects to display predicted data with standard deviations, an envelope of possible predicted data points will be shown. Various other forecast quality metrics could alternatively or additionally be used. For example, some embodiments may display an envelope showing the mean absolute scaled error, or some other error metric.

Embodiments may be configured to automate a number of different aspects. For example, embodiments can suggest and/or automatically set the appropriate date range, prediction method, seasonality, ancillary factor datasets, standard deviations, etc. A user can override these setting, or can override actual data points in the dataset 110.

Figure 5:
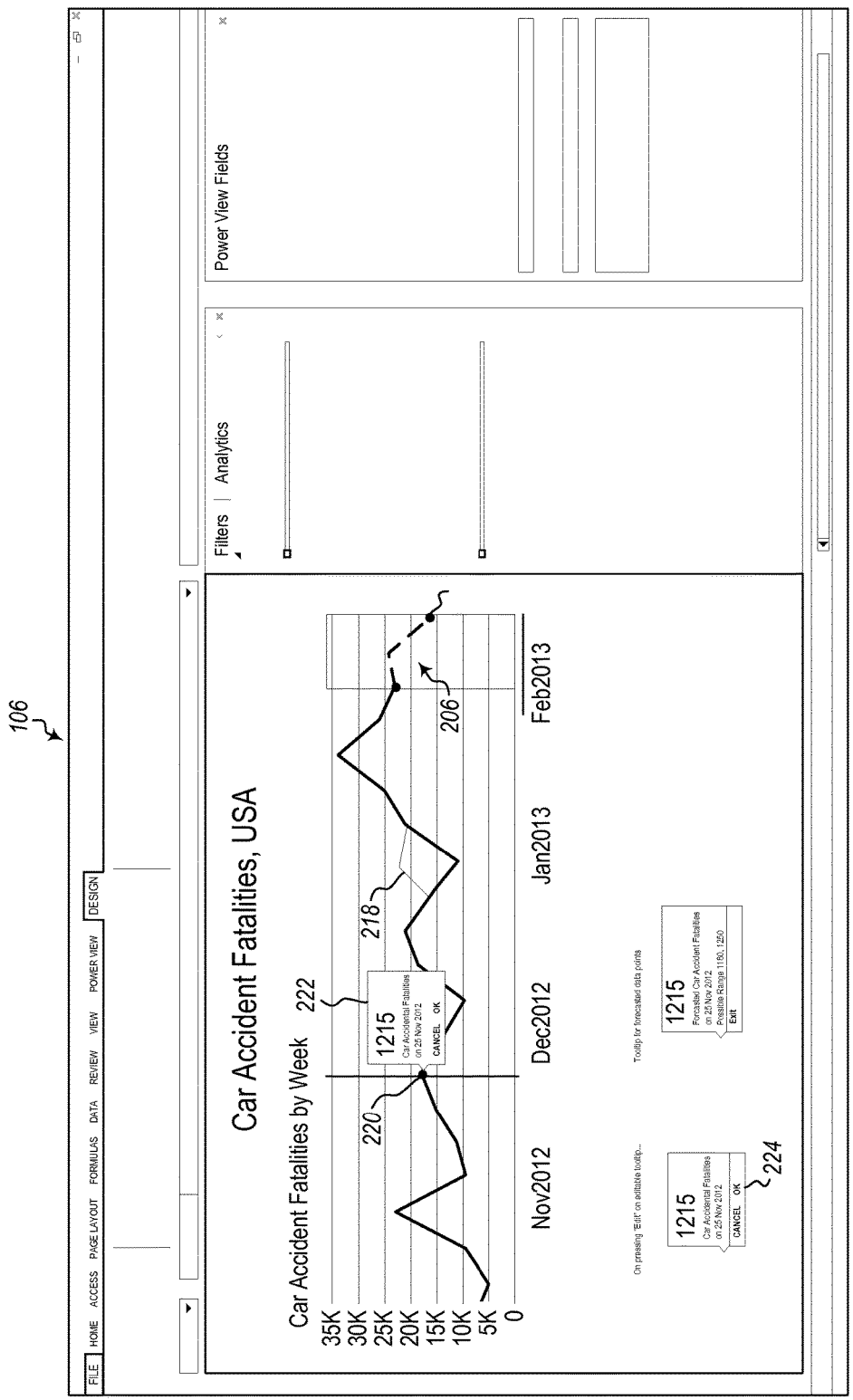
FIG. 5 illustrates a screenshot of a user interface used in a data prediction system.

Reference is directed to FIG. 5 which illustrates such functionality. For example, FIG. 5 illustrates a point 218 where a user has selected a data point and drug the data point to a new location to create hypothetical data. Notably, the original data from the dataset 110 continues to be displayed along with the hypothetical data. However, the forecast data 206 is based on any hypothetical data along with other data from the dataset 110 that has not been changed.

There are several ways that hypothetical data can be added. For example, the user interface 106 may simply allow a user to "grab" a data point (or set of data points) and to move the data point (or set of data points). In the illustrated example, nearby graph data is adjusted in a linear line fitting operation to create a hypothetical portion of a graph. In an alternative embodiment, a point can be selected, such as is illustrated at 220. Embodiments may include user interface elements, such as a pop-up window 222 that shows information about the selected point. Additionally or alternatively, embodiments may include an editing user interface element, such as that illustrated at 224. The editing user interface element allows a user to manually enter a specific value for the point 220. When user enters a new value in the editing user interface element 224, the point will be adjusted on the graph and appropriate line or curve fitting will be performed for the hypothetical point. However, the actual historical data is also maintained, and optionally displayed together with the hypothetical data.

Notably, embodiments can maintain both the actual historical data along with the hypothetical data. Thus, a user can manipulate data from the dataset 110 in a sandboxed fashion that allows the original historical data to be maintained while a user can perform various "what-if" operations to see effects on predicted data when hypothetical data is applied.

Embodiments can improve forecast quality by taking multiple factors into account. As noted above, factors (such as ancillary datasets 112) to be taken into account when performing a data prediction.

When using external factors, such as ancillary datasets, to enhance prediction algorithms, there are several factors that may need to be considered. First, appropriate factors need to be identified. Secondly, the factors need to be formatted in such a way that they factors can be properly applied to a prediction algorithm.

As shown in FIG. 1, factors have been identified as ancillary datasets 112. In the particular example, the datasets may have some correlation factor that causes them to be correlated. For example, the data in an ancillary dataset may track, over time, a similar data path to the primary dataset 110. The more closely data in an ancillary dataset tracks the primary dataset 110, the more correlated the ancillary dataset is to the primary dataset 110. Thus, known datasets may be correlated with a primary dataset by determining how closely the data in known datasets tracks data in the primary dataset 110. The more closely the data in a known dataset tracks the primary dataset 110, the more correlated the two datasets are. This may be indicated by a correlation factor. In some embodiments, this correlation faction may be a probability, raw score, adjusted score, or some other indication of correlation. While datasets are illustrated here, it should be appreciated that other factors could be identified to apply to a prediction algorithm.

Figure 6:
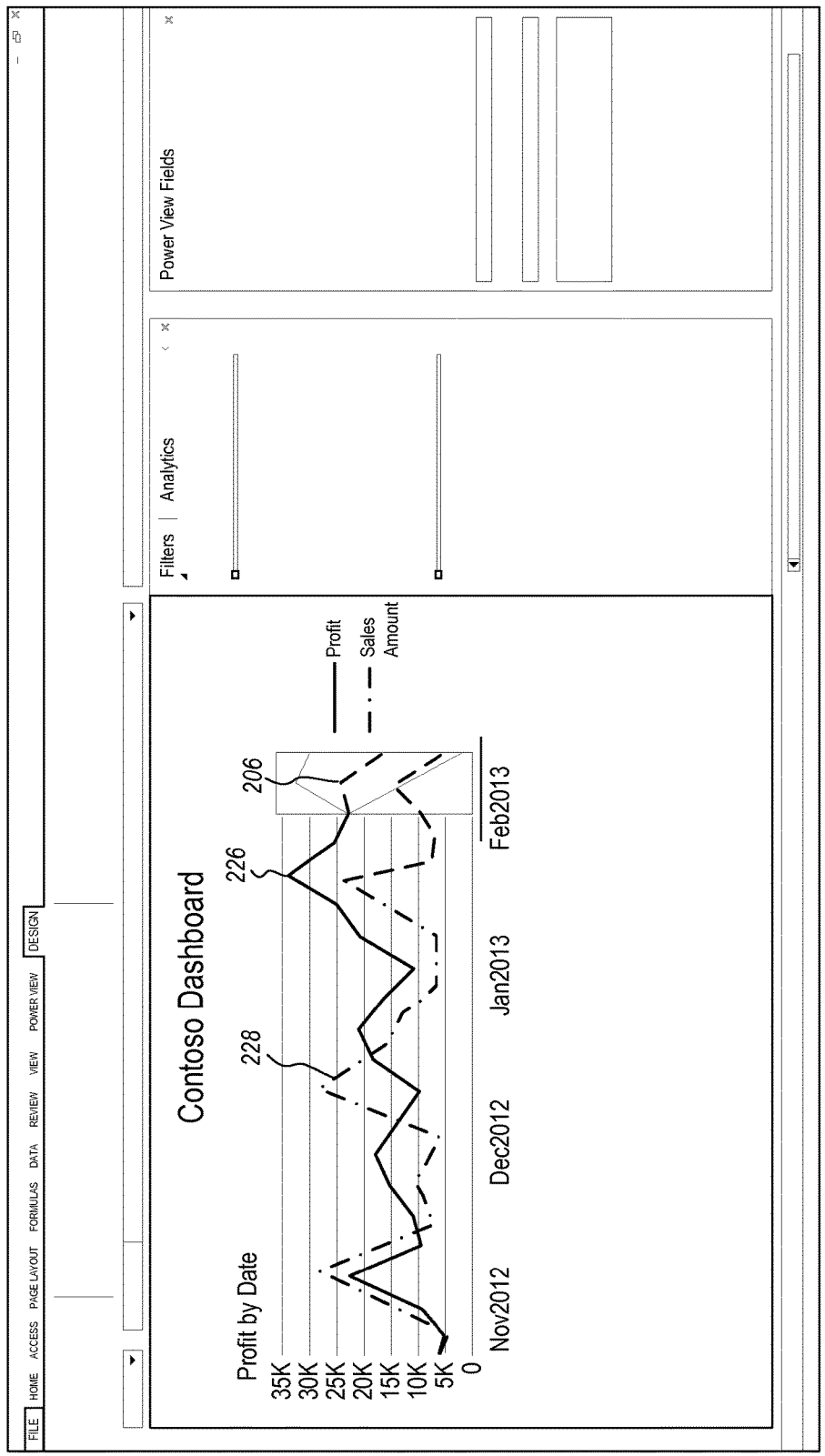
FIG. 6 illustrates a screenshot of a user interface used in a data prediction system.

Factor datasets or other factors that can be highly correlated to the primary dataset 110 can then be presented to a user for selection. For example, FIG. 4 illustrates at 214 a number of factors that can be selected by a user. FIG. 6 illustrates when a factor has been selected. In the example, FIG. 6 illustrates a representation 226 of the primary dataset and a representation 228 of an ancillary dataset that has been selected by a user. The forecast data 206 is enhanced due to the evaluation of the data from the primary dataset 110 along with data from an ancillary dataset. Thus, the user can interactively apply and visualize different factors to take into account by selecting them from a recommendation list or directly from a data representation.

Notably, correlation may be determined for various versions of a dataset. For example, consider the case where a factor affects data values in a dataset but does so in a time shifted manner. For example, consider a dataset tracking sales and another dataset tracking taxes paid. While the two datasets may be correlated, they may be so in a time shifted manner, where high sales at one point will result in high taxes at some other point several months in the future. Embodiments may determine correlation based on some time shifting. Further, embodiments may allow a user select one or more of a number of different datasets which are time shifted versions of an ancillary dataset. Thus, a user can select from a set of different datasets, where the set is composed of different time-shifted versions of the same dataset.

Embodiments can suggest top adequate factors from a data model as candidates for factors to be taken into account when performing a predictive algorithm. The factors can be sorted based on their correlation strength to a target prediction for the primary dataset 110. Embodiments may filter factors with high probability of random correlation to prevent seeming relevant factors from being used when they are in fact, irrelevant. This may be accomplished, for example, by evaluating a p-value of a t-test.

Factor recommendation components of a system may optimize factor suggestions. For example, embodiments may optimize by data generation, such as by generating predicted or future data for a factor. Alternatively or additionally, each factor dataset may be evaluated using different aggregation methods, such as for example, sum, ave, max, min etc. Thus, different versions of the same ancillary dataset may be created where each version has been aggregated in a different fashion. The aggregations may have different correlation strengths. Alternatively or additionally, as explained above, optimizations may be made for available time columns combinations in different offsets. Thus, different ancillary datasets may be created for the same dataset by pairing factor data with different time columns. When factors are generated, embodiments may prune specific aggregation types based on related aggregation results to optimize for performance.

Embodiments may additionally include functionality for identifying additional factors. For example, embodiments may have access to various datasets and may be able to calculate a correlation index between the newly identified dataset and the primary dataset 110 or may be able to access pre-calculated correlation indexes for datasets. In some embodiments, additional ancillary datasets may be identified by identifying datasets that are highly correlated with other ancillary datasets. For example, if it is known that a first ancillary dataset is highly correlated with the primary dataset 110 and that a second ancillary dataset is highly correlated with the first ancillary dataset, embodiments may suggest the second ancillary dataset for use with predictive algorithms for the primary dataset 110. Additionally, new datasets for use in refining predictive algorithms may continue to be identified by finding chains of related datasets.

In some embodiments, a dataset market may be used. For example, a clearinghouse that stores various datasets may be accessible by the processing system 104. The dataset market can accumulate datasets, calculate correlations between datasets, and otherwise manage datasets. If there is a desire to improve predictions for a given dataset, a user can consult the dataset market to find ancillary datasets that can be used in predictive algorithms.

When applying ancillary datasets to a prediction algorithm, there may be some need to condition an ancillary dataset before it can be applied to a prediction algorithm for the primary dataset 110. In particular, ancillary datasets may have missing or malformed data. Alternatively, or additionally, ancillary datasets may not be in a form that matches the primary dataset 110. For example, the primary dataset may have data points that are collected every week, while the ancillary dataset may have data points that are only collected monthly. Alternatively, the primary dataset may have an annual seasonality while the ancillary dataset has a monthly seasonality.

Embodiments may include functionality for automatically conditioning ancillary datasets. For example, embodiments could supply missing data points, smooth data or otherwise condition the data to be used with a predictive algorithm for the primary dataset 110. Additionally, data points could be extrapolated to appropriate points to cause an ancillary dataset to have the appropriate frequency of data points and seasonality to be used in a predictive algorithm for the primary dataset 110.

Thus embodiments may automatically prepare the factor data for prediction. This may be done by completing and fixing the data and/or aligning it to the target primary dataset's, such as by aligning time range, type, format, etc.

Embodiments can search for components, whether internal or external, to a system to enhance a data mode. Some embodiments can prune searching by time series qualification criteria such as data type and available time value pairs, to optimize for performance.

Figure 7:
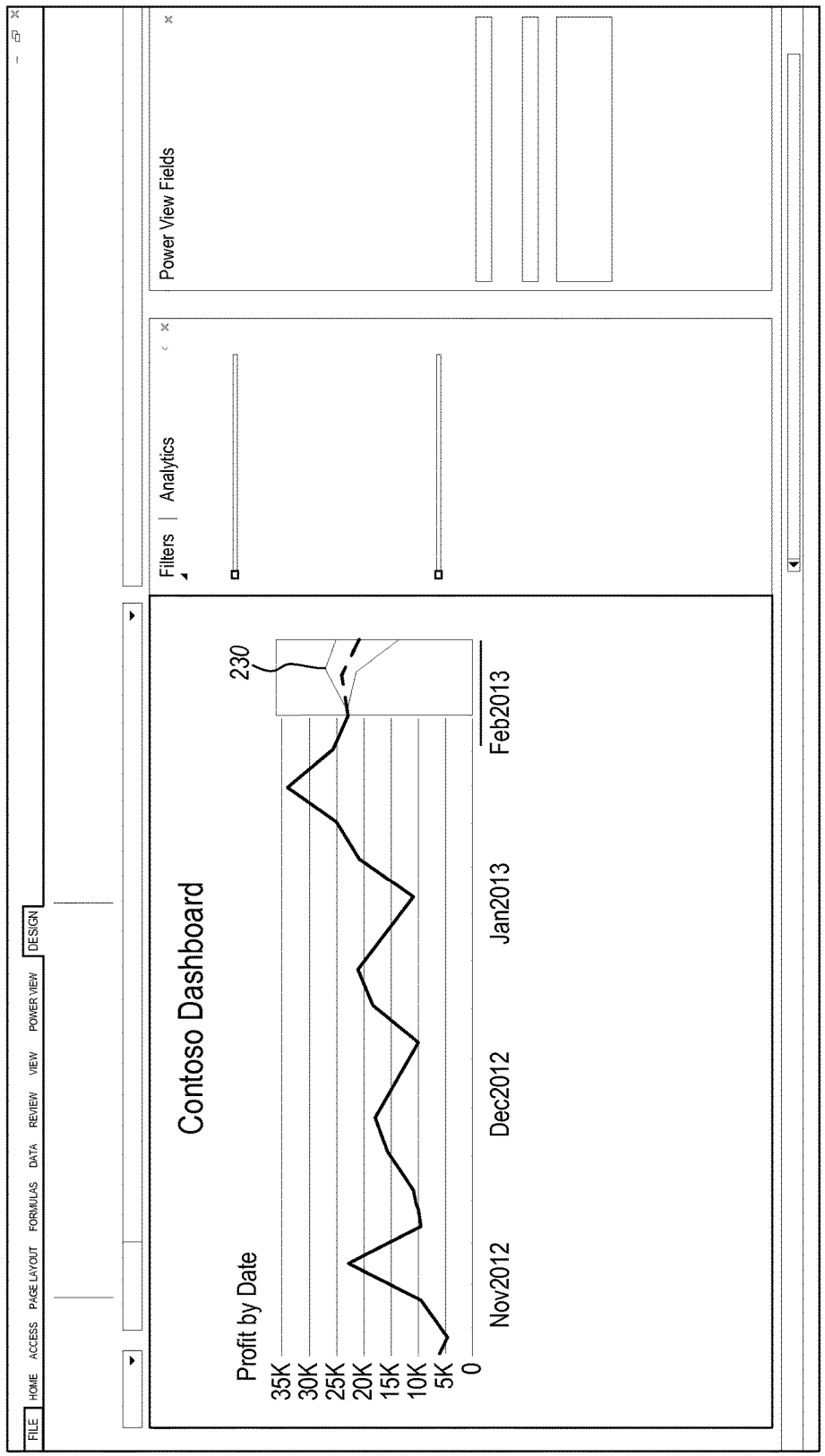
FIG. 7 illustrates a screenshot of a user interface used in a data

As noted above, embodiments may include functionality for showing an envelope of predicted results by allowing a user to select the number of standard deviations to show on a graph. In particular, the control illustrated at 216 allows a user to select the range of forecast results to show. As illustrated in FIG. 7, the user has selected one standard deviation. This causes the envelope 230 to be displayed showing a single standard deviation for the predicted data points.

Embodiments may additionally or alternatively support hindcasting. Hindcasting is often used to validate predictive algorithms. It can be used to obtain confidence in prediction results. Specifically, hindcasting is a method of retroactive forecast. In particular, once forecast data is available, a hindcast can be performed using the forecast data to generate backward looking data points to see if the hindcast gives reasonable results, thereby validating the predictive algorithm. Alternatively, embodiments can produce forecast data using less historical data. Thus, creating two months hindcast might be performed by creating a forecast based on the historical data without the last two months.

Figure 8:
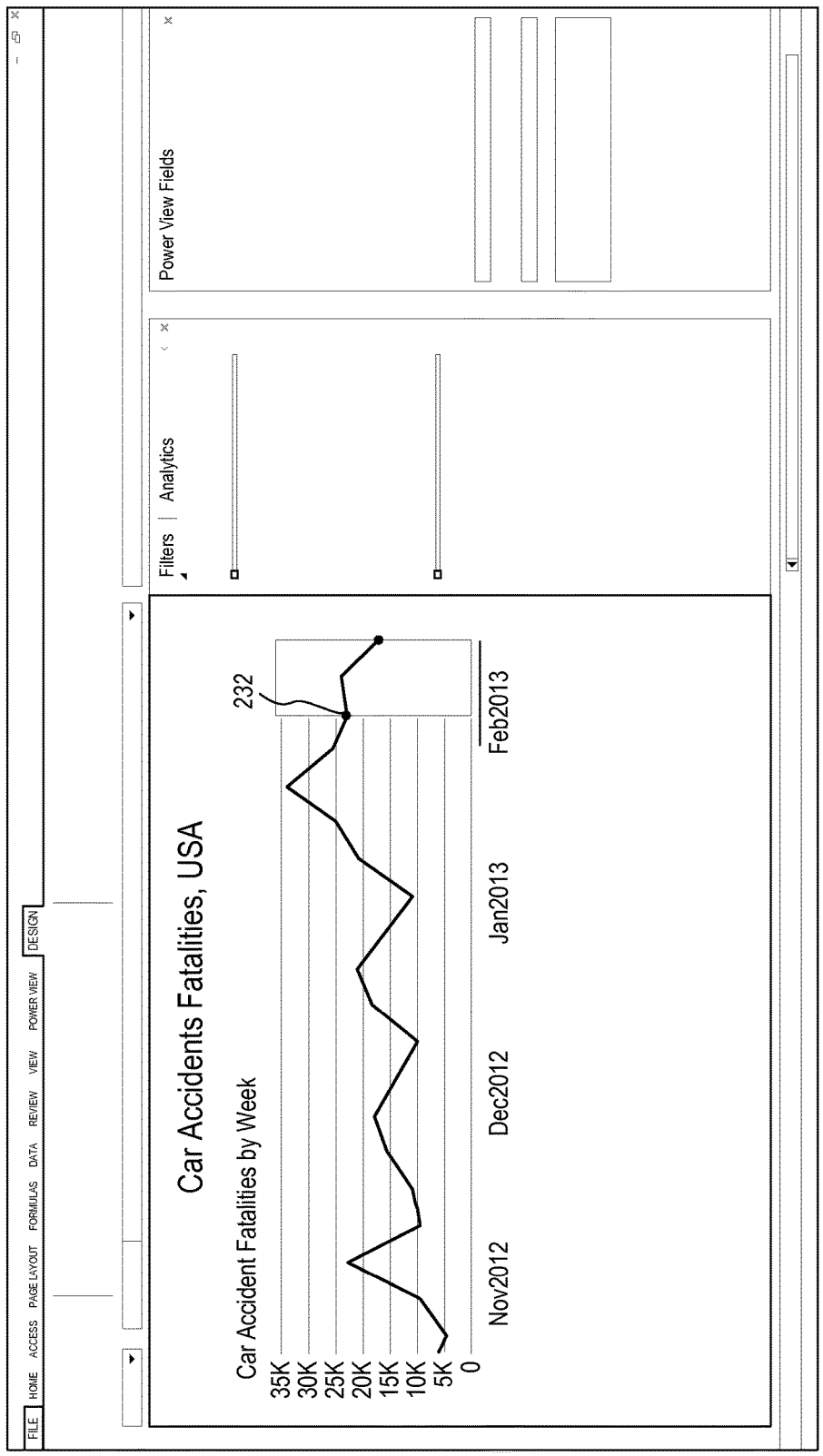
FIG. 8 illustrates a screenshot of a user interface used in a data prediction system.

Embodiments herein can implement an interactive hindcast experience. In one example, once a forecast is available and visualized, as illustrated in FIG. 8, a hindcast handle 232 is ready to use on the last historical data point (i.e. the most recent actual historical data point).

Figure 9:
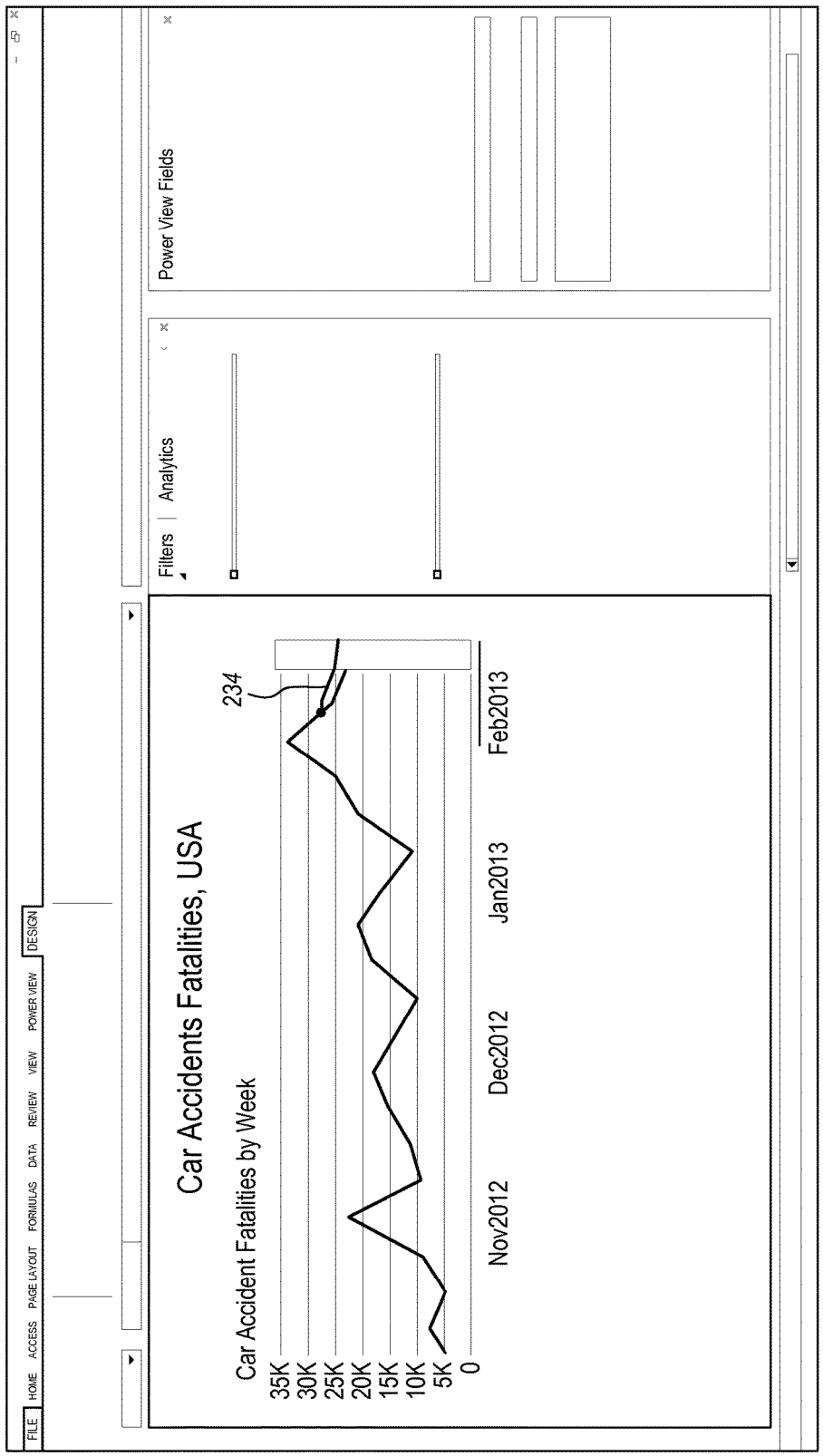
FIG. 9 illustrates a screenshot of a user interface used in a data prediction system.

As illustrated in FIG. 9, hindcast results 234 can be generated and displayed.

Figure 10:
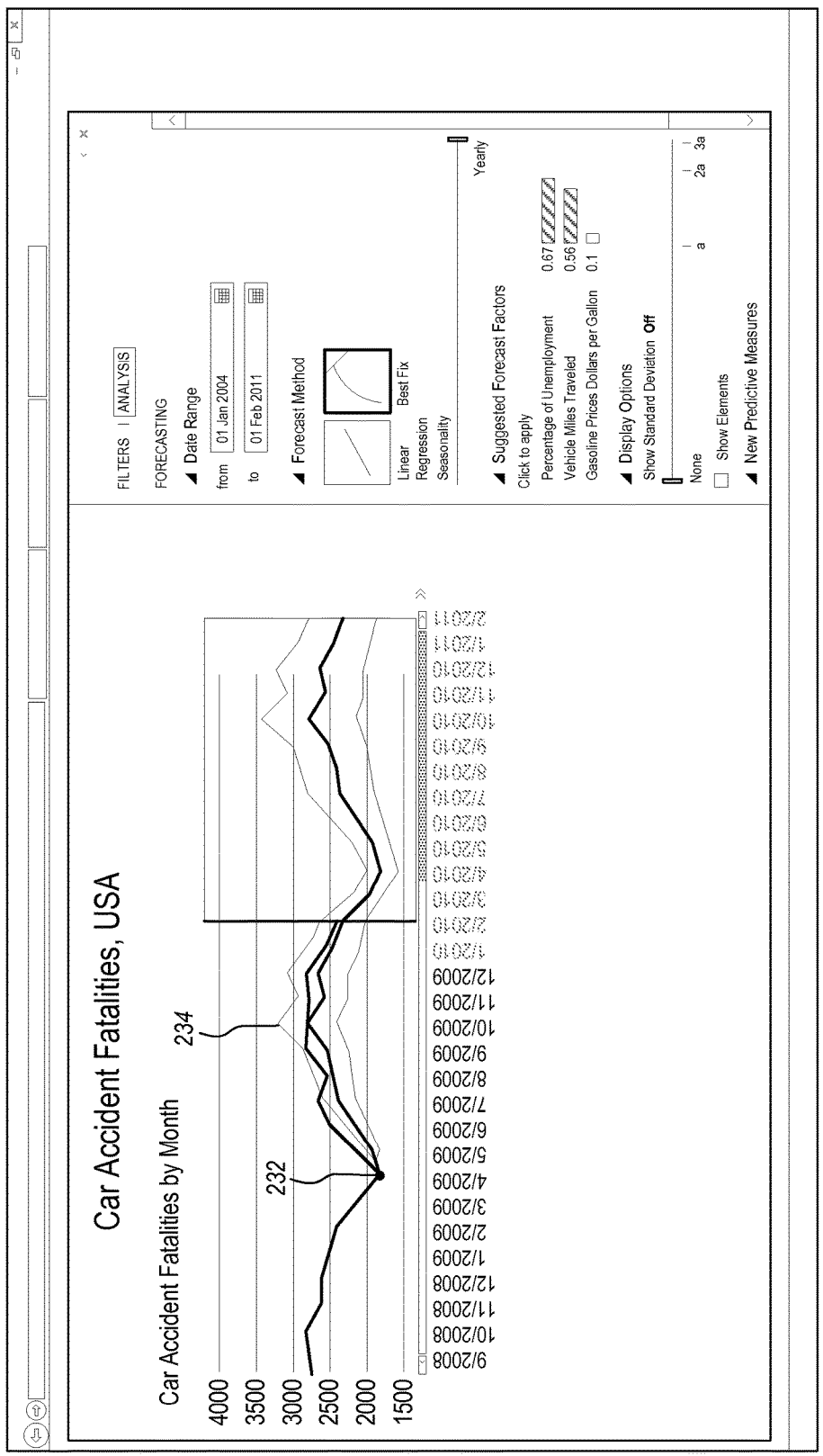
FIG. 10 illustrates a screenshot of a user interface used in a data prediction system.

As illustrated in FIG. 10, hindcasts results 234 are updated dynamically in real time. This may include updating the error margin representation. Hindcast results may be reflected along real historical data. The user can move the hindcast handle 232 forward and backwards in time, supporting dynamic analysis and rollback capabilities, interactive storytelling, and live hindcast sharing.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 11:
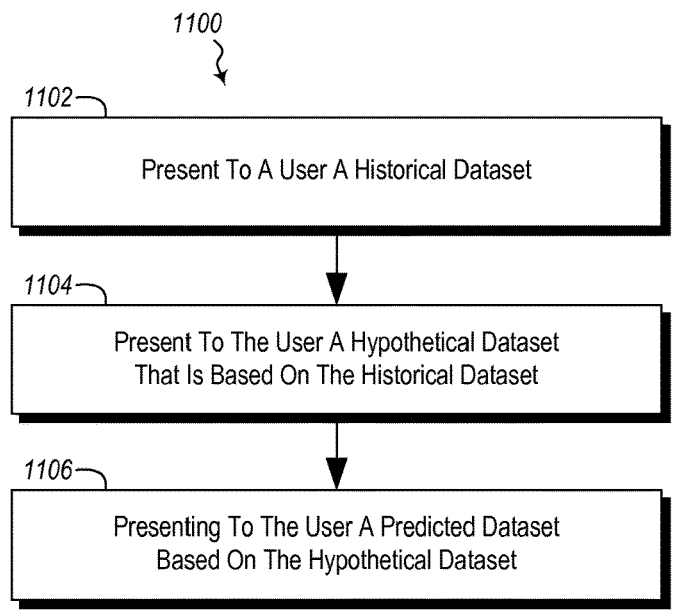
FIG. 11 illustrates a method of providing predicted data.

Referring now to FIG. 11, a method 1100 is illustrated. The method 1100 may be practiced in a computing environment. The method 1100 includes acts for providing predicted data. The method 1100 includes presenting to a user a historical dataset (act 1102). For example, as illustrated above in FIG. 5, a graph illustrating historical data is presented to a user.

The method 1100 further includes, simultaneous with presenting to the user the historical dataset, presenting to the user a hypothetical dataset that is based on the historical dataset (act 1104). For example, as illustrated in FIG. 5, the user is presented with both historical data and hypothetical data. Hypothetical data is illustrated, for example, as the point 218 which represent a deviation away from the historical data. However, the historical data from which point 218 was derived continues to be displayed with the point 218.

The method 1100 further includes presenting to the user a predicted dataset based on the hypothetical dataset (act 1106). For example, FIG. 5 illustrates forecast data 206 that is generated using predictive algorithms with at least a portion of the historical data and the hypothetical data taken as inputs. For example, the predictive algorithm may use all historical data except for at the point 218 where the algorithm will use hypothetical data.

The method 1100 may be practiced where the hypothetical dataset is a forecast dataset predicting future data values. This is illustrated in FIG. 5 by the forecast data 206.

The method 1100 may be practiced where the hypothetical dataset is a hindcast dataset predicting past data values. Examples of hindcasting are illustrated in FIGS. 9 and 10. Thus if forecast data were based on hypothetical data, the hindcast would also be based on the hypothetical data.

The method 1100 may further include receiving from the user input interacting with the historical dataset to change the historical dataset into the hypothetical dataset. As illustrated in FIG. 5 and the accompanying description, this could be done by the user dragging existing historical data points to new hypothetical values, entering hypothetical data point values (such as is illustrated using the pop-up window 222), etc.

The method 1100 may further include automatically cleansing the historical dataset to perform actions such as correcting outlier data points, supplying missing data point, standardizing data types (e.g. change strings to numbers), etc. For example, in some embodiment, the method may further include receiving user input as to how to add additional data points by receiving user input specifying an average, a line fitting algorithm, a specific value, etc. This can be used to automatically generate missing or malformed data points or to add user specified values for missing or malformed data points.

The method 1100 may be practiced where presenting to the user a hypothetical dataset that is based on the historical dataset includes visually contrasting the hypothetical dataset to the historical dataset. For example, different shading, line widths, colors, etc. may be used to distinguish historical and hypothetical datasets.

The method 1100 may be practiced where presenting to the user a predicted dataset based on the hypothetical dataset includes predicting for a time period selected by a user. For example, as illustrated in FIG. 2, a user may interact with a handle 202 to specify a time period by dragging the handle. Alternatively, the handle can be extended to have left/right arrows which the user can click. Still other alternative or additional gestures can be supported. For example double-clicking on the handle 202 can be used to reset the forecast. Other user interface elements, such as date boxes, sliders, or other elements may be supplied to allow a user to specify a time period.

The method 1100 may be practiced where presenting to the user a predicted dataset based on the hypothetical dataset comprises predicting for an automatically selected time period. For example, some embodiments may be able to generate a generally preferred time period, such as a year, month, week, day, hour, minute, etc. time period. In some such embodiments, the user can override the automatic selections.

Figure 12:
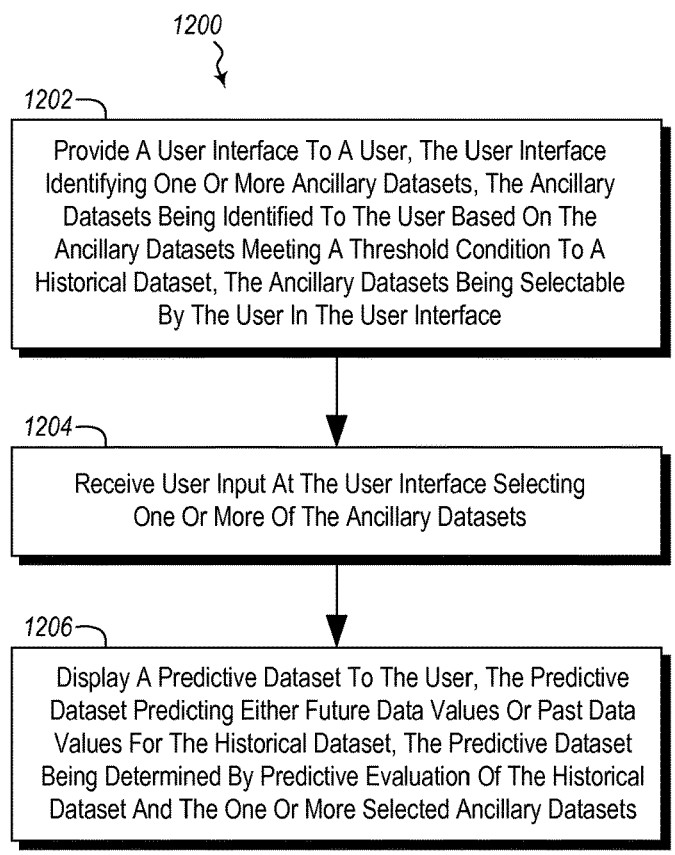
FIG. 12 illustrates a method of providing predicted data.

Referring now to FIG. 12, a method 1200 is illustrated. The method 1200 may be practiced in a computing environment. The method 1200 includes acts for providing predictive data predicting data values for a historical dataset. The predictive data predicts either future values for the historical data set or past values for the historical dataset. The method 1200 further facilitates improving the accuracy of the predictive data by identifying for a user, and allowing the user to select, ancillary datasets that can be evaluated, using a predictive evaluation, together with a historical dataset to improve the accuracy of the predictive data.

The method includes providing a user interface to a user (act 1202). The user interface identifies one or more ancillary datasets. The ancillary datasets are identified to the user based on the ancillary datasets meeting a threshold condition to a historical dataset. The ancillary datasets are selectable by the user in the user interface. For example, FIG. 4 illustrates at 214 that a user can select among different factor datasets that can then be used with predictive algorithms to forecast or hindcast data.

The method 1200 further includes receiving user input at the user interface selecting one or more of the ancillary datasets (act 1204). For example, the user can use the interface illustrated at 214 to select a dataset.

The method 1200 further includes displaying a predictive dataset to the user (act 1206). The predictive dataset predicts either future data values or past data values for the historical dataset. The predictive dataset is determined by predictive evaluation of the historical dataset and the one or more selected ancillary datasets.

The method 1200 may further include aligning at least one of the one or more ancillary datasets with the historical dataset by modifying a data value interval of the at least one of the one or more ancillary datasets to match a data value interval of the historical dataset. For example, embodiments may supply or remove data points to make both datasets have a daily, weekly, monthly, or some other interval for data values.

The method 1200 may be practiced where at least one threshold condition is based on a time shifted version, shifted in time with respect to the historical dataset, of an ancillary dataset. For example, the ancillary dataset may correlate with the historical dataset, but only when the ancillary dataset is shifted by some time value. Alternatively, if an ancillary data set has higher time granularity (for example "main" dataset is in months while the ancillary data set is in days) it can be aggregated to the same time granularity of the "main" dataset. The opposite direction is probably less common and useful but possible. If an ancillary data set has lower time granularity (for example the "main" dataset is in days while the ancillary data set is in months) it can be "divided" (equally or not) to the same time granularity of the "main" dataset.

The method 1200 may further include iteratively identifying additional ancillary datasets. The method 1200 may include providing indications of the additional ancillary datasets in the user interface allowing the user to select the additional ancillary datasets and updating the predicted dataset when an additional ancillary dataset is selected by a user. Thus, for example, the system can dynamically update ancillary datasets as correlations are discovered between ancillary datasets and the historical dataset, where those correlations meet some threshold. In some embodiment, identifying additional ancillary datasets is performed by identifying additional ancillary datasets having high correlation with already identified ancillary datasets. Thus, for example, if an first ancillary dataset is highly correlated to a second ancillary dataset, which is highly correlated to the historical dataset, then the first ancillary dataset may be provided as an ancillary dataset to improve predictive algorithms for the historical dataset.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment, a method of providing predictive data predicting data values for a historical dataset, the predictive data predicting either future values for the historical data set or past values for the historical dataset, the method further facilitating improving the accuracy of the predictive data by identifying for a user, and allowing the user to select ancillary datasets that can be evaluated, using a predictive evaluation, together with a historical dataset to improve the accuracy of the predictive data, the method comprising:

accessing the historical dataset;
identifying one or more ancillary datasets as being correlated to the historical dataset, each of the one or more ancillary datasets having been identified as meeting or exceeding a correlation threshold when compared to the historical dataset and filtering the ancillary datasets with a probability of random correlation to the historical dataset which exceeds a particular threshold;
displaying a user interface wherein the one or more ancillary datasets are selectably displayed such that the ancillary datasets are selectable by a user through the user interface;
receiving user input at the user interface selecting one or more of the ancillary datasets;
determining a predictive dataset by predictive evaluation of the historical dataset and the one or more selected ancillary datasets chosen by the user; and
displaying the predictive dataset to the user, the predictive dataset predicting either future data values or past data values for the historical dataset.

2. The method of claim 1, further comprising aligning at least one of the one or more ancillary datasets with the historical dataset by modifying a data value interval of the at least one of the one or more ancillary datasets to match a data value interval of the historical dataset.

3. The method of claim 1, wherein at least one threshold condition is based on a time shifted version, shifted in time with respect to the historical dataset, of an ancillary dataset.

4. The method of claim 1, wherein identifying one or more ancillary datasets comprises identifying a plurality of datasets where the datasets in the plurality of datasets are based on a same value set, but based on a different time line.

5. The method of claim 1, wherein identifying one or more ancillary datasets comprises identifying a plurality of datasets where the datasets in the plurality of datasets are different versions of the same dataset based on different aggregation methods.

6. The method of claim 1, further comprising iteratively identifying additional ancillary datasets and providing indications of the additional ancillary datasets in the user interface allowing the user to select the additional ancillary datasets and updating the predicted dataset when an additional ancillary dataset is selected by a user.

7. The method of claim 6, wherein identifying additional ancillary datasets is performed by identifying additional ancillary datasets having a correlation with already identified ancillary datasets which exceeds a particular threshold.

8. A computer program product comprising a computer readable hardware storage device having computer executable instructions stored thereon that when executed by one or more processors causes the following to be performed:

accessing a historical dataset;
identifying one or more ancillary datasets as being correlated to the historical dataset, each of the one or more ancillary datasets having been identified as meeting or exceeding a correlation threshold when compared to the historical dataset and filtering the ancillary datasets with a probability of random correlation to the historical dataset which exceeds a particular threshold;
displaying a user interface wherein the one or more ancillary datasets are selectably displayed such that the ancillary datasets are selectable by a user through the user interface;
receiving user input at the user interface selecting one or more of the ancillary datasets;
determining a predictive dataset by predictive evaluation of the historical dataset and the one or more selected ancillary datasets chosen by the user; and
displaying the predictive dataset to the user, the predictive dataset predicting either future data values or past data values for the historical dataset.

9. The computer program product of claim 8, further comprising computer executable instructions stored thereon that when executed by one or more processors causes aligning at least one of the one or more ancillary datasets with the historical dataset by modifying a data value interval of the at least one of the one or more ancillary datasets to match a data value interval of the historical dataset.

10. The computer program product of claim 8, wherein at least one threshold condition is based on a time shifted version, shifted in time with respect to the historical dataset, of an ancillary dataset.

11. The computer program product of claim 8, wherein identifying one or more ancillary datasets comprises identifying a plurality of datasets where the datasets in the plurality of datasets are based on a same value set, but based on a different time line.

12. The computer program product of claim 8, wherein identifying one or more ancillary datasets comprises identifying a plurality of datasets where the datasets in the plurality of datasets are different versions of the same dataset based on different aggregation methods.

13. The computer program product of claim 8, further comprising computer executable instructions stored thereon that when executed by one or more processors causes iteratively identifying additional ancillary datasets and providing indications of the additional ancillary datasets in the user interface allowing the user to select the additional ancillary datasets and updating the predicted dataset when an additional ancillary dataset is selected by a user.

14. The computer program product of claim 13, wherein identifying additional ancillary datasets is performed by identifying additional ancillary datasets having a correlation with already identified ancillary datasets which exceeds a particular threshold.

15. In a computing environment, a system for providing predictive data predicting data values for a historical dataset, the predictive data predicting either future values for the historical data set or past values for the historical dataset, the system further facilitating improving the accuracy of the predictive data by identifying for a user, and allowing the user to select ancillary datasets that can be evaluated, using a predictive evaluation, together with a historical dataset to improve the accuracy of the predictive data, the system comprising:

one or more processors; and
one or more computer readable media, wherein the one or more computer readable media comprise computer executable instructions that when executed by at least one of the one or more processors cause the following to be performed:

accessing the historical dataset;

identifying one or more ancillary datasets as being correlated to the historical dataset, each of the one or more ancillary datasets having been identified as meeting or exceeding a correlation threshold when compared to the historical dataset and filtering the ancillary datasets with a probability of random correlation to the historical dataset which exceeds a particular threshold;

displaying a user interface wherein the one or more ancillary datasets are selectably displayed such that the ancillary datasets are selectable by a user through the user interface;

receiving user input at the user interface selecting one or more of the ancillary datasets;

determining a predictive dataset by predictive evaluation of the historical dataset and the one or more selected ancillary datasets chosen by the user; and displaying the predictive dataset to the user, the predictive dataset predicting either future data values or past data values for the historical dataset.

16. The system of claim 15, wherein at least one threshold condition is based on a time shifted version, shifted in time with respect to the historical dataset, of an ancillary dataset.

17. The system of claim 15, wherein identifying one or more ancillary datasets comprises identifying a plurality of datasets where the datasets in the plurality of datasets are based on a same value set, but based on a different time line.

18. The system of claim 15, wherein identifying one or more ancillary datasets comprises identifying a plurality of datasets where the datasets in the plurality of datasets are different versions of the same dataset based on different aggregation methods.

19. A computer-implemented method performed by one or more processors when executing computer-executable instructions, wherein the computer-implemented method controls an interface in a manner that permits the interface to enhance the ability to more accurately forecast predicted values for either future or past values for a historical dataset, the computer-implemented method comprising:

storing in a database a historical dataset from which predicted values may be forecast;

storing in the database a plurality of ancillary datasets;

the one or more processors identifying one or more ancillary datasets that meet one or more threshold conditions by correlating in one or more ways to the predicted values that may be forecast from the historical dataset;

based on meeting the threshold condition, presenting at a user interface at least some of the identified ancillary datasets for selection;

based on selection of at least one of the ancillary datasets presented at the user interface for selection, the one or more processors presenting at the user interface a predictive dataset that is derived from a combination of the historical dataset and the selected at least one ancillary dataset;

determining a forecast method, determining the forecast method including at least identifying a particular prediction algorithm from a plurality of prediction algorithms and selecting parameters associated with the identified prediction algorithm; and the one or more processors applying the determined forecast method to the predictive dataset to enhance the forecast for the predicted values such that the accuracy of the predicted values, as compared to forecasting the predicted values based solely on the historical dataset, is increased.

* * * * *